United States Patent [19]

Stine et al.

[11] 3,990,479
[45] Nov. 9, 1976

[54] METHOD OF MAKING RADIATION CURED ELASTOMERIC ARTICLES FROM THERMOPLASTIC ELASTOMERS AND ARTICLES MADE THEREFROM

[75] Inventors: Clifford R. Stine, Solon; William J. Herbert, Mantua; Bruce E. Klipec, Aurora, all of Ohio

[73] Assignee: Samuel Moore and Company, Aurora, Ohio

[22] Filed: Apr. 19, 1974

[21] Appl. No.: 462,385

Related U.S. Application Data

[62] Division of Ser. No. 328,366, Jan. 31, 1973, Pat. No. 3,911,202.

[52] U.S. Cl. ............................ 138/125; 138/177; 138/DIG. 7; 204/159.2; 428/36
[51] Int. Cl.² .................. F16L 11/06; F16L 11/08; C08F 2/46
[58] Field of Search ................. 138/DIG. 7, 177; 204/159.2, 160.1; 138/125, 118; 428/36

[56] References Cited
UNITED STATES PATENTS

| | | | |
|---|---|---|---|
| 3,231,481 | 1/1966 | Ameniya et al. | 204/160.1 |
| 3,253,618 | 5/1966 | Cook | 138/125 |
| 3,269,862 | 8/1966 | Lanza et al. | 204/159.2 |
| 3,624,054 | 11/1971 | Barton et al. | 204/159.2 |
| 3,658,669 | 4/1972 | Colomb et al. | 204/159.2 |
| 3,784,492 | 1/1974 | Colomb, Jr. et al. | 204/159.2 |
| 3,789,042 | 1/1974 | Colomb et al. | 204/159.2 |

OTHER PUBLICATIONS

Skala, Western Electric Technical Digest No. 1 1/66 pp. 31 & 32.

*Primary Examiner*—Richard E. Aegerter
*Assistant Examiner*—Steven L. Stephan
*Attorney, Agent, or Firm*—Clelle W. Upchurch

[57] ABSTRACT

The present invention relates to methods for processing curable thermoplastic elastomers and particularly to flexible, shaped articles made therefrom which have improved high strength, radiation and temperature resistance and electrical characteristics useful as fluid transmission tubing and/or as electrical insulation. Such articles are made from uncured, thermoplastic elastomer materials — in the form of selectively hard, radiation sensitive, flowable solids — which are thermoplastically molded to provide an essentially uncured, dimensionally stable, intermediate shaped article. Such intermediate articles are radiation-cured to provide finished cross-linked articles having such characteristics.

13 Claims, 8 Drawing Figures

METHOD OF MAKING RADIATION CURED ELASTOMERIC ARTICLES FROM THERMOPLASTIC ELASTOMERS AND ARTICLES MADE THEREFROM

This is a division of application Ser. No. 328,366, filed 1/31/73 now U.S. Pat. No. 3,911,202.

The present invention relates to a method for processing curable thermoplastic elastomers, and particularly to flexible, shaped articles made therefrom which are useful as fluid transmission tubing and/or as electrical insulation and which are particularly useful in various industrial power (i.e., nuclear power) instrumentation applications, such as in high pressure tubing, insulated instrumentation cable and wire and the like.

Currently, there is a strong need in many industrial applications for superior fluid transmission tubing and/or electrical insulation products, such as insulated wire and cable, particularly due to the requirement for high performance specifications. For example, in power industry instrumentation, such as in power plants utilizing nuclear and fossil fuel, there is an important need for high performance instrumentation products, such as tubing, insulated wire, cable or the like, which incorporate superior chemical and physical properties, such as high strength; temperature, radiation, oil and ozone resistance; and electrical characteristics, for many applications.

Heretofore, various processes have been employed for subjecting polmeric materials, in the form of film, flat stock, and the like, whose properties are susceptable to beneficial mutation, by irradiation to yield a cured product. It has been found, however, that with the advent of the nuclear age, such processes and resultant products, although advantageous for various applications, are not satisfactory for many of the aforementioned uses, particularly in the field of power industry instrumentation. For instance, elastomers, such as natural or synthetic rubbers, have generally been cured under relatively high temperatures and pressures with chemical curing agents, such as sulphur, or peroxides to give the desired cross-linked characteristics. However, such chemical curing agents first had to be distributed into the raw elastomer stock without undesirably initiating the curing reaction. If the prepared stock had to be stored, curing had to be prevented, such as by refrigeration or the like. Then the shaped article had to be formed without undesired reaction. Finally, such article had to be cured at elevated temperature and pressure. Each of these operations is not only time consuming, but renders it difficult to produce a product by mass production techniques in an efficient and rapid manner. Previously, wire insulation fabrication generally required long vulcanization chambers or baths which required relatively precise temperature and a pressure control. In tubing fabrication, such continuous vulcanization processes required the use of internal supports in order to provide the hollow tubing form. Importantly, in the case of extrusions, the extrudate had little "green strength" after such processing, requiring immediate subsequent vulcanization. Attempts to improve such "green strength" by the addition of filler materials has resulted in the loss of electrical properties rendering the product unsuitable for the aforementioned applications. In addition to such processing difficulties, chemically cured products in certain instances retain the residue of the chemical cross-linking agent which may have deleterious resultant effects upon the performance characteristics of the product. Furthermore, in such processes, colorants were generally required to be added along with the curing agent since the heat required for mixing colorants might otherwise cure the stock, thereby making the initial compounding for such processes difficult.

Although various thermoplastic materials, such as polyethylene, polystyrene and the like, have been beneficially cross-linked, e.g., by chemical or radiation means, they are subject to pronounced deficiencies for the aforementioned applications. For example, the insulating characteristics of such materials have generally been offset by their relatively low melting point and their low resistance to flame and oxidation. Moreover, this greatly limits the usefulness of such materials for elevated temperature applications.

Generally, such prior processes are not susceptible to providing a relatively thin walled shaped article, e.g., 10 mils or less, which wall structure has a uniform thickness with dimensional stability for the aforementioned applications. For instance, such continuous extrusion and/or vulcanization processes are carried out under relatively high pressures and temperatures which force the material down into the interstices around the support, e.g., wire or cable bundles, thereby resulting in a dimensionally distorted jacket oftentimes requiring the use of auxilliary fillers to provide a uniform shape thereto. In addition, the distorted and/or non-uniform wall structure of such product generally renders it difficult to peel or strip the same from the support rendering it a problem to inspect, repair, and/or replace the covering, e.g., in the case of an insulation or jacket, when required.

In accordance with this invention, there is provided an efficient and economical method for processing curable, thermoplastic elastomers and articles made therefrom, and particularly to shaped articles, such as tubing and/or electrical insulations, which have improved high strength, radiation and temperature resistance and electrical characteristics for particular applications in industrial power instrumentation. In the invention, such articles are made from uncured, thermoplastic elastomer materials — in the form of selectively hard, radiation sensitive, flowable solids — which are thermoplastically molded to provide an essentially uncured, dimensionally stable, intermediate shaped article. These intermediate shaped articles are radiation cured to provide finished cured articles having such characteristics. In the invention, such articles are generally made by:

I. providing a curable, radiation sensitive, thermoplastic elastomer material in the form of a flowable solid, said curable material having a hardness sufficient to provide dimensional stability in an intermediate shaped article thermoplastically molded therefrom, II. thermoplastically molding said curable material into a curable, essentially uncured, substantially self-supporting, intermediate shaped article having a dimensionally stable, flexible, relatively thin-walled construction of indeterminate length; and III. curing said intermediate shaped article with ionizing radiation at a dosage of at least about 5 megarads IV. to provide a finished, cured, non-braided elastomeric shaped article having improved high strength, radiation and heat resistance and electrical characteristics.

From the foregoing, the following description and the accompanying drawings, it will be seen that the present invention provides a novel method for processing curable, thermoplastic elastomers and shaped articles made therefrom which have many advantages over known processes and resultant products made therefrom, particularly in modern industrial instrumentation fields, e.g., nuclear power plants or the like. Accordingly, the present invention provides a method for processing curable, thermoplastic elastomers and shaped articles, such as tubing and/or electrical insulation, which are efficient and economical to produce, and which incorporate improved high strength; radiation, heat, ozone and oil resistance; and excellent electrical characteristics for such applications over a relatively wide temperature range. In addition, such shaped articles incorporate excellent resistance to distortion under load at elevated temperatures, resistance to abrasion and have excellent flame retardation with low smoke emission with relatively low chlorine off-gassing, as compared to articles made by known processes. The method of the invention provides an extremely controllable process and eliminates catalyst or accelerator residues that would otherwise have a deleterious effect upon the radiation resistance, heat aging, and dielectric strength of the finished article. The method of the invention results in the production of shaped articles having relatively thin walls of uniform structure which incorporate high strength characteristcs comparable to that of articles having appreciably greater wall thickness. As opposed to prior processes, the present invention eliminates the need for separate compounding and/or extrusion operations, yet provides a wide control over the physical properties during processing of the finished article by use of a modifiable single or master stock material. Importantly, the method of the invention results in the provision of an intermediate shaped article which is essentially uncured, yet which is dimensionally stable and substantially self-supporting so as to be conveniently handled and/or stored for relatively indefinite periods of time without deleterious effect. Accordingly, the method of the invention may be advantageously carried out as a continuous one-step process or as a multiple step process as may be required for a particular application so as to lend extremely good processing flexibility to the user, as desired.

Figure 1:
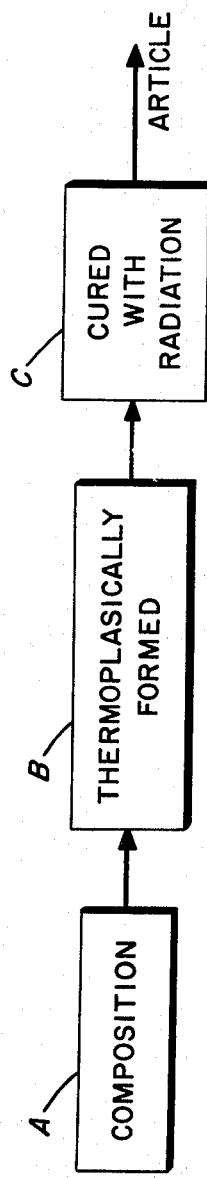
FIG. 1 is a general diagrammatic representation of the process of the present invention.

In general, and as diagrammatically illustrated in FIG. 1, the method of the present invention may comprise:

1. providing (A, FIG. 1) a polymeric composition which is
    a. elastomeric,
    b. thermoplastic (or heat fusible),
    c. radiation sensitive, and
    d. curable (but uncured):
2. thermoplastically forming (B, FIG. 1) the polymeric composition into an intermediate article which is
    a. elastomeric,
    b. thermoplastic (or heat fusible),
    c. radiation sensitive, and
    d. curable (but essentially uncured) and which has the desired final configuration; and
3. curing (C, FIG. 1) the intermediate article with radiation to provide a finished article which is free from external fibrous reinforcement and is
    a. elastomeric,
    b. thermoset and generally heat resistant,
    c. generally radiation resistant, and
    d. cured.

Figure 2:
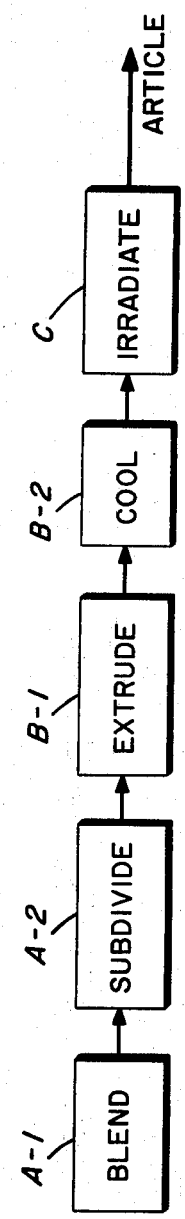
FIG. 2 is a diagrammatic representation of a preferred embodiment of the process of the present invention.
Figure 3:
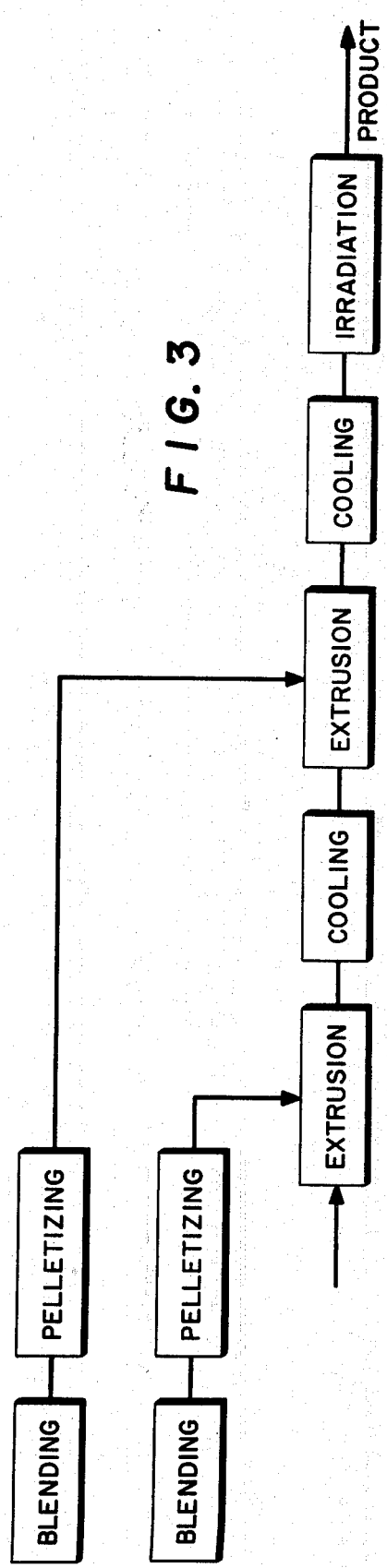
FIG. 3 is a diagrammatic representation of a further preferred embodiment of the process of the present invention.
Figure 4:
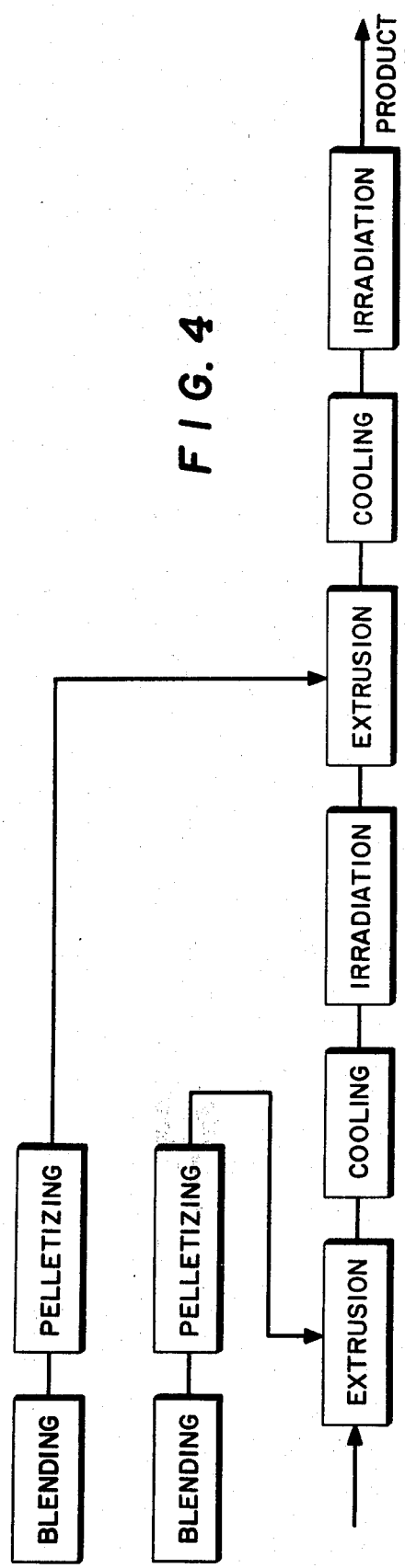
FIG. 4 is a diagrammatic representation of a further preferred embodiment of the process of the present invention.

As diagrammatically illustrated in FIG. 2, the polymeric composition may be provided by uniformly blending the initial components of the composition and then physically subdividing the composition into a flowable solid. Preferably, the article is formed by thermoplastically extruding the same to form the intermediate article and by then cooling the intermediate article, if necessary. The intermediate article is preferably cured by irradiating it with electrons having a kinetic energy of at least about 100,000 electron volts. The foregoing method uses a polymeric composition which is thermoplastic, radiation sensitive, and curable, but uncured, to form a finished article which is substantially thermoset, generally heat and radiation resistant, and cured.

The preferred articles of the invention, as may be seen by reference to FIGS. 5 to 8 may be configured as either a tubing article 1 having only substantially non-porous walls or as an electrically insulated electrical conductor article 10 comprising an electrical conductor 11 and an electrical insulator 12. The tubing article 1 and the electrical insulator 12 may have either a single non-porous layer construction (FIGS. 5 and 7) composed of said polymeric composition or a plurality of non-porous walls (FIGS. 6 and 8) composed of the same or different polymeric compositions.

In the invention, and particularly with reference to FIG. 2, the curable but uncured, radiation sensitive, thermoplastic, elastomeric polymeric composition is provided by uniformly blending (A-1, FIG. 2), the initial components of the desired polymeric composition together and then physically subdividing (A-2, FIG. 2), the composition to form a flowable solid to facilitate efficient handling. It is highly desirable that the polymeric composition be based on a polymeric component which is capable of conferring on the composition both the aforesaid initial curable (but uncured), radiation sensitive, thermoplastic and elastomeric characteristics and the final cured, radiation resistant, heat resistant, and elastomeric characteristics. Two types of base polymers which have been found suitable for use as the aforesaid polymeric component are an elastomeric olefinic terpolymer and an elastomeric halosulfonated polyolefin. Moreover, elastomeric olefinic terpolymer compositions and elastomeric halosulfonated polyolefin compositions having the aforesaid initial and final characteristics are preferred.

Since the uncured polymeric composition of the invention should be physically subdivisible into a flowable solid, the composition preferably has sufficient hardness to provide the desired shape and dimension stability to retain its physical configuration at room temperature (about 25° C) for extended periods of time, such as for several weeks when stored, for example. This prevents agglomeration of the subdivided compositon into an intractable mass which would be difficult to handle. In addition, the uncured polymeric composition preferabaly has sufficient hardness and tensile modulus to provide the desired shape and dimensional stabilty to withstand handling between the forming (B, FIG. 1) and curing (C, FIG. 1) stages of the invention. If the preferred shape and dimension stability are absent, equipment which handles the formed, intermediate article might otherwise alter its configuration with the subsequent curing stage irreversibly fixing this configuration, thereby producing a defective finished article. Therefore, it is preferred that the uncured polymeric composition have a minimum hardness of at least about Shore 45A and a minimum tensile modulus (tensile strength at 100% elongation) of at least about 300 pounds per square inch.

The preferred olefinic terpolymer composition is a poly(ethylene-propylene-diene) composition, the base polymer component of the composition being a poly(ethylene-propylene-diene) polymer having the aforesaid initial and final characteristics. The desired poly(ethylene-propylene-diene) polymer may have the following relative proportions of olefin monomers, based on mole percent:

ethylene — from 40% to 90%,
propylene — from 50% to 10%, and
diene — from 3% to 10%.

In the invention, the preferred relative proportions, based on mole percent, include ethylene — from 50% to 70%,
propylene — from 50% to 25%, and
diene — from 2% to 5%.

It has been found that a poly(ethylene-propylene-ethylidene norbornene) polymer is a preferred base polymer having the aforesaid initial and final characteristics. It has a particularly favorable radiation sensitivity, such as a radiation sensitivity sufficient to commence significant curing, or cross-linking, at dosages as low as 1 Mrad (megarad) with 1 Mev (million electron volt) electrons. Commercially, this polymer can be obtained from the Copolymer Rubber and Chemical Corporation under the trade designations:

EPsyn 40, EPsyn 40-A, EPsyn 55, EPsyn 70,
EPsyn 70-A, EPsyn 4506, EPsyn 5508, EPsyn 5509,
EPsyn 7506 ("EPsyn" being a Copolymer trademark).

The base polymer may also be poly(ethylene-propylene-1, 4 hexadiene) polymer having the aforesaid initial and final characteristics which may be obtained commercially from E. I. duPont de Nemours and Co. under the trade designations:

NORDEL 1040, NORDEL 1070, NORDEL 1145,
NORDEL 1245, NORDEL 1320, NORDEL 1440,
NORDEL 1470, "NORDEL" being a duPont trademark), or a poly(ethylene-propylene-methylene norbornene) polymer having the aforesaid initial and final characteristics which may be obtained commercially from Enjay Chemical Company under the trade designations:

VISTALON 2504, VISTALON 3708, VISTALON 4608, and VISTALON 6505 ("VISTALON" being an Enjay trademark) or a poly(ethylene-propylene-dicyclopentadiene) polymer having the aforesaid initial and final characteristics which may be obtained commercially under the general trade name ROYALENE from United States Rubber Co. A blend of two or more base polymers may be used, such as a blend of EPsyn 4506 and EPsyn 5509 polymers, and may be preferable in some instances.

As presently available commercially, poly(ethylene-propylene-diene) polymers having the aforesaid initial and final characteristics, per se, lack the needed hardness and tensile modulus to give the desired shape and dimension stability. Moreover, it is highly desirable to fill and reinforce them with a reinforcing filler material in preparing the uncured polymer compositions used in the present invention. The filler material acts as a hardening and reinforcing agent. The amount of reinforcing filler should be sufficient to provide a total composition with a minimum hardness of at least Shore 45A and a minimum tensisle modulus (tensile strength at 100% elongation) of at least 300 p.s.i. It has been found that suitable reinforcing filler concentrations, by weight, for use with a poly(ethylene-propylene-diene) polymer are from 50 parts per 100 parts of base polymer to 250 parts per 100 parts of base polymer. Kaolin clay is preferred as a reinforcing filler material in preparing the desired poly(ethylene-propylene-diene) compositions with a particularly preferred form of filler material being kaolin clay surface-coated with vinyl silane. The preferred filler concentration, by weight for the kaolin clay coated with the silane is from 100 parts per 100 parts base polymer to 200 parts per 100 parts of base polymer. The preferred reinforcing filler may be obtained commercially from the Burgess Pigment Company under the trade designation BURGESS KE clay.

In the invention, other reinforcing filler materials which may be useful (together with their trade designations and sources) include: calcinated clay, or partially hydrated aluminum (III) silicate, (WHITEX from Freeport Kaolin Co.); FEF carbon black (Statex FT from Cities Service Company); hard clay, or hydrated aluminum (III) silicate, (SUPREX from J. M. Huber Corp.); SRF carbon black ( — ); zinc (II) oxide (ST. JOE 20 from Harwick Standard Chemical Company) talc, or hydrous magnesium (II) silicate, (MISTRON VAPOR from Sierra Talc Co.); FT carbon black ( — ); litharge, or lead (II) oxide, (TLD-90 from Wyrough and Loser, Inc.); red lead ( — ); and TRANSLINK-37 clay (TRANSLINK-37 from Freeport Kaolin Co.). In addition, polymeric hardening and reinforcing agents such as a low density polyethylene polymer having a maximum density of about 0.940 grams per centimeter (see Modern Plastics Encyclopedia - 1966, Vol. 43, No. 1A, p. 264, Table 1), may preferably be used. Suitable low denisty polyethylene (0.916 grams per cubic centimeter) may be commercially obtained from the Union Carbide Corp. under the trade designation DYNH-3 ("DYNH" being a Union Carbide trademark). The low density polyethylene is preferably used in a concentration, by weight, of 20 to 30 parts per 100 parts of base polymer.

In the invention, it may be preferable to incorporate a plasticizing material, such as a processing lubricant, or processing aid, in the uncured olefinic terpolymer composition. Suitable plasticizer concentrations, by weight, for use in the composition are from about a trace per 100 parts of base polymer to 100 parts per 100 parts of base polymer. A preferred plasticizer is vinyl silane. It may be commercially obtained from Union Carbide under the trade designation vinyl silane A-172. It is preferably used in a concentration, by weight, of about 1 part per 100 parts of the base polymer. Additional plasticizers, (together with their trade designation and sources) which may be useful include:

paraffinic oil (SUNPAR 2280 and SUNPAR 150 from Sun Oil Company), process oil (CIRCO from Sun Oil Company), and paraffin.

Use of a blend of poly(ethylene-propylene-diene) polymers can provide some plasticizing effect to the uncured olefinic terpolymer composition.

In the invention, the uncured olefinic terpolymer composition may preferably include an anti-oxidant material in a concentration, by weight, from about 0.5 parts per 100 parts of base polymer to about 2.5 parts per 100 parts of base polymer. A preferred anti-oxidant material is poly(trimethyl-dihydroquinoline) which is commercially available from R. T. Vanderbilt Company under the trade designation AGERITE Resin D ("AGERITE" being a trademark). Also, the uncured olefinic terpolymer composition may preferably include a thermal stabilizing material in a concentration, by weight, from about 5 parts per 100 parts of base polymer to about 20 parts per 100 parts of base polymer. A preferred thermal stabilizer is zinc oxide which is also useful as a reinforcing filler and which may be obtained from Harwick Standard Chemical Company under the trade mark designation ST. JOE 20. In addition, the uncured olefinic terpolymer composition may preferably include a radiation sensitizer.

The preferred halosulfonated homopolymer composition is a halosulfonated homopolymer composition — specifically, a chlorosulfonated polyethylene composition. The base polymer component of the composition being a chlorosulfonated polyethylene polymer having the aforesaid initial and final characteristics. A preferred chlorosulfonated polyethylene polymer is commercially available from E. I. duPont de Nemours and Co. under the trade designations HYPALON 20, HYPALON 30, HYPALON 40s, HYPALON 40, HYPALON 40 HV, HYPALON 45 and HYPALON 48 ("HYPALON" being a duPont tradmark).

Since, as presently commercially available, chlorosulfonated polyethylene polymers, per se, lack the needed hardness and tensile modulus to give the desired shape and dimension stability (as is also the case with commercial poly(ethylene-propylene-diene) polymers), it is desired to add a reinforcing filler material in preparing the chlorosulfonated polyethylene compositions of the present invention. The amount of reinforcing filler should be sufficient to provide a total composition with a minimum hardness of at least Shore 60A and a minimum tensile modulus (tensile strength at 100% elongation) of at least 300 p.s.i. Suitable reinforcing filler concentrations, by weight, for use with a chlorosulfonated polyethylene polymer are from 5 parts per 100 parts of base polymer to 250 parts per 100 parts of base polymer. The preferred concentration range is from 5 parts per 100 parts of base polymer to 50 parts per 100 parts of base polymer. Litharge, or lead (II) oxide, is preferred as a reinforcing filler material in preparing the desired chlorosulfonated polyethylene compositions. It may be commercially obtained under the trade designation TLD-90 from Wyrough and Loser, Inc. Preferred reinforcing fillers and their preferred range of concentraton, by weight, expressed in parts of plasticizer to 100 parts of base polymer (together with trade designations and sources) include:

calcined clay, or partially hydrated aluminum (III) silicate, from 5 to 25 (WHITEX from Freeport Kaolin Co.);

FEF carbon black from 5 to 35 (STATEX FT from Cities Service Company);

MT carbon black from 5 to 25 (STATEX MT from Cities Service Company);

hydrated alumina, or hydrated aluminum (III) oxide, from 5 to 50 (HYDRAL 710 from Aluminum Co. of America); and antimony (III) trioxide from 5 to 20 (THERMO GARD S from M and T Chemicals). Additional reinforcing filler materials which may be useful (together with their trade designations and sources) are: silica, or silicon (II) dioxide, (HI SIL 233 from PPG Industries, Inc.); hard clay, or hydrated aluminum (III) silicate, (SUPEREX from J. M. Huber Corp); magnesia, or magnesium (II) oxide, (MAGLITE D from Merck and Co., Inc.); precipitated whiting (CALCENE TM from PPG Industries, Inc.); soft clay, or hydrated aluminum (III) silicate, (McNAMEE from R. T. Vanderbilt Co., Inc.); SRF carbon black ( —); water ground whiting, or calcium (II) carbonate, (ATOMITE from Thompson-Wienman and Co.); titanium (IV) dioxide (R-902 from E. I. duPont de Nemours and Co.); zinc (II) oxide (ST. JOE 20 from Harwick Standard Chemical Company); talc, or hydrous magnesium (II) silicate, (MISTRON VAPOR from Sierra Talc Co.).

In the invention, it may be preferable to incorporate a lubricant, such as a processing plasticizer or processing aid, in the uncured halosulfonated polyolefin composition. Appropriate plasticizer concentrations, by weight, for use in the compositions are from a trace per 100 parts of base polymer to 100 parts per 100 parts of base polymer. Preferred plasticizers and their preferred range of concentration, by weight, expressed in parts of plasticizer to 100 parts of base polymer (together with trade designations and sources) include:

chlorinated paraffin from 5 to 20 (CHLOROWAX 70-S and CHLOROWAX-LV from Diamond Sahmrock Co.), polymeric hydrocarbon from 5 to 20 (KENFLEX A from Kenrich Petrochemical Co.), aromatic process oil from 5 to 20 (SUNDEX 790 from Sun Oil Company), and comarone — indene resin from 5 to 20, (CUMAR MH 2-½ from Neville Chemical Company). Additional plasticizers which may be useful include:

parrafin, petrolatum and polyester plasticizer (HARFLEX 300 from Wallace and Tiernan, Inc.).

In the invention, the uncured halosulfonated polyolefin composition may also preferably include a water stabilizing and acid acceptor, such as the aforesaid litharge. The litharge is preferably used in a dispersion form in a concentration, by weight, from a trace per 100 parts of base polymer to 45 parts per 100 parts of base polymer. Also, the uncured halosulfonated polyolefin composition may preferably include a radiation sensitizer. A preferred radiation sensitizer is m-phenylene dimaleimide (HVA-2 from E. I. duPont de Nemours and Co.) which is preferably used in a concentration, by weight, from a trace per 100 parts of base polymer to three parts per 100 parts of base polymer.

The initial components of the desired foregoing uncured polymer composition is blended to uniformly distribute its components into a uniform composition (A-1, FIG. 2). This is preferably done by first mixing the respective components of the composition first in an intensive internal batch mixer having sigma blades, such as a BANBURY mixer, ("BANBURY" being a trademark of Farrel Corp.) in order to flux the components at a high temperature and then continuing the mixing by masticating the mixture on an open mill, such as a two-roll mill, which also converts the lump form discharged by the batch mixer into a strip form. After open milling, the composition can be optionally sieved to mechanically remove physical impurities and undesired lumps. The milled composition is stripped from the mill in sheet, or strip, form and passed through a water bath to cool it. After cooling, it is subjected to an air wipe to remove or strip retained water. Finally, the composition is physically subdivided into dice or pellets by feeding the strip into either a dicing machine or a pelletizing machine. In its subdivided form, the composition is a flowable solid having an extended storage life at room temperature. However, the pellets or dice can be stored at room temperature until required, as desired.

In the invention, the uncured, thermoplastic polymer compositions are thermoplastically processed so as to shape them into an intermediate article which has the configuration of the desired finished article. It has been found that the compositions of the present invention are particularly suitable for shaping by thermoplastic extrusion, although other techniques such as thermoplastic injection molding might be employed. The composition, in its subdivided form as a flowable solid, is fed into a thermoplastic extruder which fuses the subdivided composition into a plastic fluid under compressive and sheer stress and externally applied heat.

The uncured, but curable, polymeric composition of the present invention is thermoplastically extruded at an elevated temperature with a long residence time in the extruder. In other words, high temperatures and long barrel and screen packs are used in the extrusion of the present instance. Thermoplastic extrusion of the present invention utilizes extruders having a barrel length to diameter ratio (L/D ratio) of 20:1 or greater, with about 32:1 being the present maximum size. This longer relative barrel length to barrel diameter provides a longer residence time for the uncured, but curable composition of the present invention within the extruder and provides greater homogeneity and better mixing action. Thermoplastic extrusion of the present invention is conducted at relatively high temperatures with sufficient heat being used to reach and maintain them. The aforesaid olefinic terpolymer composition of the present invention has a preferred stock melt temperature in the extruder from 300°F to about 350°F and can, in fact, be increased to about 380°F without scorching (undesired curing). The halosulfonated polyolefin composition has a preferred stock melt temperature in the extruder from 250° to 300°F.

In the thermoplastic extrusion of the present invention, production speed can be increased by increasing melt temperature and thereby decreasing melt viscosity. External heat increases the melt temperature above that obtainable from internal work heat alone. The ratio of external heat to inheat is from approximately 0.2:/1 to approximately 0.3:/1 and possibly as high as 0.5:/1. If desired, scrap from the extruder can be re-extruded and used without significant change in melt rheology or physical properties of the composition being extruded. In view of the high melt temperatures and long residence time in the extruder, it is preferable to exclude or minimize chemical curing agents or initiators from this composition used in the present invention.

In forming the foregoing extruded articles, a die is affixed to the terminal end of the extruder to shape the composition as it exits from the extruder into an atmospheric pressure environment. This die may be either a pressure die using elevated extrusion pressures or a drawdown die. A drawdown die providing an annular solid configuration with a generally uniform thickness is preferred. The drawdown die provides an extruded polymeric article having a relatively thin-walled construction of uniform thickness, thereby minimizing nonuniform characteristics in the finished article. In addition, where the intermediate article is electrical primary insulation or cable jacketing, the drawn down uniform thickness follows the configuration of the conductor being insulated, thereby facilitating stripping of the jacketing, if desired.

Due to the shearing action of the extruder barrel on the composition as the screw advances it toward the extrusion die and the long residence time produced by the length of the extruder barrel, it is possible to mix additional non-reactive materials, preferably in a flowable solid form — such as powder or pellet — into the uncured composition as it is fed into the extruder. Suitable materials for addition at the extrusion stage are colorants, radiation sensitizers, lubricants and thermal stabilizers. By this arrangement, the composition can be formulated as a natural color, master composition and then colored, or otherwise modified, as desired, during the extrusion step.

The intermediate article thus provided by the foregoing thermoplastic forming technique is:
 a. elastomeric,
 b. still thermoplastic (or heat fusible),
 c. still radiation sensitive, and
 d. still curable (but essentially uncured).

As such, this intermediate article has an extended shelf life so that it can be stored for extended periods at room temperature before it is finally cured. This intermediate article is also self-supporting and dimensionally stable at room temperature so that storage does not deteriorate its extruded configuration. This extrusion process may be used to form a number of differently configured intermediate articles, such as rod, sheet, flat or tubular film, tubular gasketing, web coating, channels, tees, angles, tubing or wire coating. The preferred configurations for the intermediate articles of the present invention are a tubing article having one or more substantially non-porous, unbraided walls and an electrically insulated, electrical conductor article, such as a coated wire.

The intermediate tubing article of the present invention is preferably formed by extruding, as aforesaid, an uncured composition of the present invention from a drawdown tubing die. The intermediate tubing article may have a single layer construction or a plurality of extruded layers. In the single layer construction, the nominal wall thickness may be from 10 mils to 100 mils with 30 mils to 60 mils being preferred. The single layer construction may be formed of either one of the aforesaid uncured compositions, although the halosulfonated polyolefin composition is preferred. In the composite construction, both uncured compositions of the present invention may be used, with one forming an inner layer, and the other forming the next adjacent layer. The inner layer is preferably composed of the uncured olefinic terpolymer composition, and the next adjacent layer is composed of the aforesaid halosulfonated polyolefin composition. In the composite construction the total nominal thickness may be from 20 mils to 120 mils. The layer of uncured olefinic terpolymer composition may be from 10 mils to 80 mils, and the layer of uncured halosulfonated polyolefin composition may be from 30 mils to 60 mils. In making the composite construction, the inner layer is preferably extruded first with the next adjacent layer being extruded over it later using a drawdown tubing die mounted in a crosshead.

The intermediate electrical conductor article of the present invention is preferably formed by extruding, as aforesaid, an uncured composition of the present invention around an electrical conductor member using a drawdown or pressure, wire coating die mounted in a crosshead. The intermediate conductor article includes an electrical conductor and an electrical insulator which may have either a single layer construction or a multi-layer, composition construction. In the single layer construction the nominal wall thickness of the single layer may be from 10 mils to 45 mils. The single layer may be composed of either of the aforesaid uncured compositions, although the uncured, olefinic terpolymer composition is preferred. The preferred nominal wall thickness of the olefinic terpolymer composition is 30 mils, while that for the halosulfonated polyethylene is 15 or 30 mils. In the composite construction, both uncured compositions may be used with one forming an inner layer and the other forming the next adjacent layer. The inner layer is preferably composed of the aforesaid uncured olefinic terpolymer composition and the next adjacent layer is composed of the aforesaid uncured halosulfonated polyolefin composition. The total thickness of the composite insulated may be from 20 mils to 120 mils with 30 mils to 45 mils being preferred. The layer of uncured olefinic terpolymer composition may be from 10 mils to 60 mils with 20 mils being preferred. The layer of uncured halosulfonated polyolefin composition may be from 10 mils to 60 mils with 10 mils being preferred. In making the composite construction, the inner layer is preferably extruded first, with the next adjacent layer being extruded over it later using a drawdown wire coating die mounted in a crosshead. Following each extrusion, the uncured intermediate article is cooled to room temperature, such as in a graduated temperature, cooling bath. After cooling, the article can be either stored or immediately radiation-cured. If it is to be stored, it is preferably drawn onto a temporary storage spool using spooling apparatus as known in the art.

In order to produce the cured article of the present invention, the uncured, intermediate article is radiation-cured, such as by irradiation with high energy, ionizing radiation. This irradiation cures, or cross-links, the article's polymeric composition and irreversibly fixes the configuration of the finished article. While alpha, beta, gamma or neutron irradiation might be used, the preferred means of irradiation is high energy electrons which may be conveniently controlled. The source of the high energy electrons may be an electron accelerator, such as a Van de Graff accelerator. The energy of the electrons should be from 100,000 electron volts to 3 mev. Desirably, the electrons have an energy from 500,000 electron volts to about 1 mev with about 1 mev being preferred. During the irradiation process, the uncured intermediate articles are conveyed into the electron beam of the accelerator and uniformly exposed until the desired total dose of radiation has been given. It has been found to be highly desirable to use a total dosage from 1 Mrad to 20 Mrads. Preferably, the total dosage is from 5 megarads to 12 megardads and optionally from 10 Mrads to 12 Mrads. The curing is done at room temperature and atmospheric pressure, eliminating the need for temperature and pressure control. The aforesaid curing by high energy electron irradiation is virtually instantaneous so that the intermediate article may be passed continuously under the electron beam at a relatively high speed, thereby providing a high speed curing operation, for example, of the order of 500 feet per minute or more for individual conductors. In fact, thermoplastic forming and radiation curing may be done as a single high speed operation.

The uncured intermediate article is preferably conveyed under the electron beam by paying off the article from its storage reel in a controlled manner with a pay-off mechanism, transporting it under the beam in an orientation which optimizes exposure to the beam with a transport mechanism, and respooling the radiation-cured final article onto a storage reel in a controlled manner with a respooling mechanism.

In subsequent usage, alternatively the uncured intermediate article can be fed directly under the beam from the thermoplastic forming stage using the aforesaid transport mechanism in a continuous operation, as desired.

The finished shaped article provided by the foregoing method, in its preferred form, has a flexible, relatively thin-walled continuous construction of indeterminate length which is closed in transverse cross-section. Preferably, the finished article has an annular configuration of indeterminate length, that is, a solid configuration of indeterminate length defined by a pair of concentric cylindrical surfaces. This configuration is suitable for use either as a tubular article in which an internal passageway is open or as an electrical insulator in which the internal passageway is occupied by an electrical conductor.

The finished shaped article of the present invention is also:

a. elastomeric,
b. heat resistant,
c. radiation resistant,
d. cured,
e. substantially self-supporting, and
f. dimensionally stable.

In addition to these properties, it also may have a hardness, as cured, of at least 50 A Shore or a tensile modulus (tensile strength at 100% elongation), as cured, of at least 400 p.s.i. (and preferably both) so as to provide the desired self-support and shape and dimensional stability characteristics. The hardness may range from 50 A Shore to 98 A Shore, with the preferred hardness being from 60 A Shore to 98 A Shore, with the preferred hardness being from 60 A Shore to 85 A Shore; while the tensile modulus (as expressed previously) may range from 500 p.s.i. to 1000 p.s.i. for the aforesaid olefinic terpolymer composition and from 400 p.s.i. to 1200 p.s.i. for the aforesaid halosulfonated polyolefin composition.

The finished shaped article may have the following additional significant properties listed in Tables 1-A and 1-B:

TABLE 1-A

Poly(ethylene-propylene-diene) Composition

I. Physical and Chemical Characteristics
   A. Ultimate Tensile Strength
      (ASTM D-412)
      at 72° F                                  1000 p.s.i. (minimum)
      at 250° F                                 400 p.s.i. (minimum)
   B. Tensile Modulus
      (ASTM D-412)
      1. Tensile strength at 100% elongation
      at 72° F                                   500 p.s.i. (minimum)
      at 250° F                                200 p.s.i. (minimum)
      2. Tensile strength at
      50% elongation (at 72%)              300 p.s.i. (minimum)
   C. Ultimate Tensile Elongation
      (ASTM D-412)
      at 72° F                                   250% (minimum)
      at 250° F                                150% (minimum)
   D. Heat Distortion
      (conditioned for 5 minutes and
      under load for 15 minutes at
      150° C)
      (IPCEA-S-61-402)                       10% (maximum)
   E. Heat Aging
      (air oven aging for 7 days at
      121° C)
      (IPCEA-S-19-81)
      Ultimate tensile strength
      retained                                    90% (minimum)
      Ultimate tensile elongation
      retained                                    75% (minimum)
   F. Moisture Absorption
      (1) Gravimetric Method             6.0 miligrams per
      (IPCEA-S-19-81)                      sq. inch
                                                        (maximum)
      (2) Electrical Method (EM-1000)
      75% water
      (IPCEA-S-19-81, Sec. 6.92)
      increase in specific insulation
      capacitance from 1 to 14 days      3.5% (maximum)
      increase in specific insulation
      capacitance from 7 to 14 days      1.5% (maximum)
   G. Oil Immersion
      (ASTM Oil No. 2 for 18 hrs. at
      121° C)
      (IPCEA-S-19-81)
      ultimate tensile strength
      retained                                    50% (minimum)
      ultimate tensile elongation
      retained                                    50% (minimum)
   H. Ozone Resistance
      (24 hrs. at 25° C)
      (IPECEA-S-19-81)
      at .015% concentration                no cracks
      at .030% concentration                no cracks
   I. Cold Bend
      (24 hrs. at −40° C)
      (IPCEA-S-19-81)                       no cracks
   J. Vertical Flame Resistance
      (IPCEA-S-19-81)                       pass
      EPDM - 30 mils
      Chlorosulfonated polyethylene - 15 mils

TABLE 1-B

Chlorosulfonated Polyethylene Composition

I. Physical Characteristics
   A. Ultimate Tensile Strength
      (ASTM-D-412)
      at 72° F                                  1800 p.s.i. (minimum)
      at 250° F                                 400 p.s.i. (minimum)
   B. Tensile Modulus
      (1) tensile strength at 100%
      elongation
      (ASTM-D-412)
      at 72° F                                  400 p.s.i. (minimum)
      at 250° F                                 100 p.s.i. (minimum)
      (2) Tensile strength at 50%
      elongation                                 300 p.s.i. (minimum)
   C. Ultimate Tensile Elongation
      (ASTM-D-412)
      at 72° F                                  300% (minimum)
      at 250° F                                 100% (minimum)
   D. Heat Distortion
      (conditioned for 5 minutes
      and under load for 15 minutes

TABLE 1-B-continued

| Chlorosulfonated Polyethylene Composition | |
|---|---|
| at 150° C) (IPCEA-S-61-402) | 10% (maximum) |
| E. Heat Aging (air over aging for 168 hrs. at 121° C) (IPCEA-S-19-81) Ultimate tensile strength retained | 50% (minimum) |
| Ultimate tensile elongation retained | 50% (minimum) |
| F. Moisture Absorption (1) Gravimetric Method (7 days at 70° C) (IPCEA-S-19-81) | 30 miligrams per sq. in.(maximum) |
| (2) Electrical Method (EM-1000) (75° C water) (IPCEA-S-19-81, Sec. 6.92) increase in specific insulation capacitance from 1 to 14 days | 5.0% (maximum) |
| increase in specific insulation capacitance from 7 to 14 days | 2.5% (maximum) |
| G. Oil Immersion (ASTM Oil No. 2 for 18 hrs. at 121° C) (IPCEA-S-19-81) Ultimate tensile strength retained | 60% (minimum) |
| Ultimate tensile strength retained | 50% (minimum) |
| H. Ozone Resistance (24 hrs. at 25° C) at .015% concentration | no cracks |
| at .030% concentration | no cracks |
| I. Cold Bend (24 hrs. at −40° C) (IPCEA-S-19-81) | no cracks |
| J. Vertical Flame Resistance (IPCEA-S-19-81) | pass |

Figure 8:
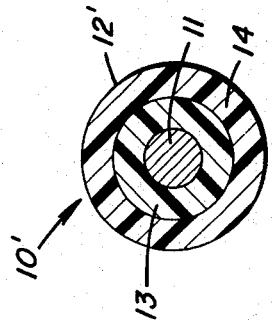
FIG. 8 is a cross-section of a finished shaped article of the present invention.
Figure 7:
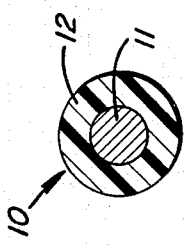
FIG. 7 is a cross-section of a finished shaped article of the present invention.

As previously stated, the preferred specific embodiments of the finished shaped article of the present invention may be (1) a tubing article 1 (FIGS. 5 and 6) or (2) an electrical insulated, electrical conductor article 10 (FIGS. 7 and 8).

The finished tubing article 1 (FIGS. 5 and 6) of the present invention comprises a tubular member with a centrally disposed, internal passageway therein. This passageway is adapted for the receipt of a fluid material or a suitably configured solid material, such as a small diameter wire or a fluidized powder. Preferably, the interior cylindrical surface defining the passageway and the cylindrical exterior peripheral surface of the tubular member are concentric and define an annular configuration of indeterminate length. The tubular article 1 (FIGS. 5 and 6) has the characteristics of the finished shaped article of the present invention, as aforesaid. It should have a total overall nominal wall thickness from 10 mils to 100 mils, with 30 to 60 mils being preferred.

Figure 6:
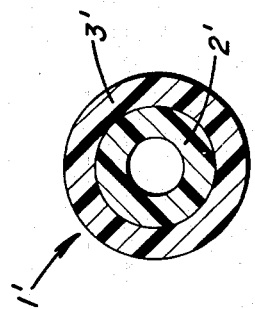
FIG. 6 is a cross-section of a finished shaped article of the present invention.
Figure 5:
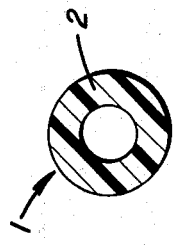
FIG. 5 is a cross-section of a finished shaped article of the present invention.

The tubular member may comprise either a single layer construction (FIG. 5) or a multi-layer composite construction (FIG. 6). In the single layer construction (FIG. 5), the tubular member comprises a single extruded layer 2 of polymeric material selected from the aforesaid group of polymeric compositions of the present invention. Preferably, the single layer is composed of the aforesaid halosulfonated polyolefin composition. The nominal wall thickness of the single layer should be substantially the same dimension as the corresponding dimension of the corresponding intermediate shaped article, and should preferably be identically the same. Consequently, the ranges in the nominal wall thickness, as finished, should correspond to those given in connection with the corresponding intermediate shaped article. The mechanical and chemical characteristics of the finished single layer tubular article 1 correspond to those previously given in connection with the finished shaped article including those listed in Tables 1-A and 1-B. However, it is preferable for the tensile modulus (tensile strength at 100% elongation) to be from 500 p.s.i. to 1000 p.s.i. for an olefinic terpolymer composition and from 800 p.s.i. to 1200 p.s.i. for a halosulfonated polyolefin composition to provide reduced diametric expansion under pressure and increased burst pressure.

While the aforesaid single layer construction has been described in terms of a single layer tubular article, it should be understood that additional layers of non-fibrous materials other than the polymeric compositions of the present invention may be applied to the single layer of polymeric composition of the present invention. Further, the tubular article 1 may comprise an electrical insulation sleeving, an electrical conduit, or an outer jacket of a bundle of electrical wires.

In the composite construction of the finished tubular article 1' of the present invention (FIG. 6), the composite tubular article 1' comprises a tubular member including a first layer 2' of polymeric material selected from the group of polymeric compositions of the present invention and a second layer 3' of polymeric material selected from the group of polymeric compositions of the present invention. Preferably, the first layer 2' comprises one of said compositions and the second layer 3' comprises another of said compositions. In the preferred embodiment of the composite tubular article 1', the first layer 2' comprises an olefinic terpolymer composition of the present invention and the second layer 3' comprises a halosulfonated polyolefin composition of the present invention. The respective nominal wall thickness of the two layers, singly and in combination, should be substantially the same as those dimensions of the corresponding intermediate shaped article, and should preferably be identically the same. Also, the ranges in the nominal wall thickness, as finished, should correspond to those given in connection with the corresponding intermediate shaped article. The mechanical and chemical characteristics of the finished composite tubular article 1 correspond to those previously given in connection with the finished shaped article including those listed in Tables 1-A and 1-B. In addition, the preferred olefinic terpolymer composition/halosulfonated polyolefin composition construction provides improved heat aging and ozone and flame resistance characteristics while giving reduced smoke emission and hydrogen chloride off-gassing upon thermal degradation of the article. These characteristics are particularly valuable in power industry applications.

While the aforesaid composite construction has been described in terms of a two layer construction, it should be understood that additional layers of materials may be applied to this composite construction. Consequently, the composite construction tubular article 1' of the present invention may form a part of a multi-layer composite tubing product, such as being an inner core tube or an outer jacket of a composite tubing including thermal insulation material. Further, the tubular article 1' may comprise an electrical insulation sleeving, an electrical conduit, or an outer jacket of a bundle of electrical wires.

The finished electrical conductor article 10 of the present invention (FIGS. 7 and 8) comprises an electrical conductor member 11 and an electrical insulator 12. The conductor article 10 (FIGS. 7 and 8) is particularly adapted for use as power industry instrumentation wire and/or thermocouple extension wire. Preferably, the insulator 12 encompasses the conductor 11 in electrically insulating relation and engages it. The conductor article 10 (FIGS. 7 and 8) has the characteristics of the finished shaped article of the present invention, as aforesaid. The insulator 12 should have a total overall nominal wall thickness from 10 mils to 120 mils, with 20 mils to 50 mils being preferred. The conductor member 11 may comprise a single wire or multiple strands of wire and may be composed of aluminum, copper, tin-coated copper, iron, or an alloy, such as a thermocouple alloy like chromel alloy, alumel alloy, or constantan alloy. The nominal thickness of the conductor may be from 10 American Wire Gauge to 20 American Wire Gauge and is preferably cylindrical, although other shapes may be used. The insulator 12 may comprise either a single layer construction (FIG. 7) or a multi-layer composite construction (FIG. 8). In the single layer construction (FIG. 7), the insulator 12 comprises a single layer of polymeric material selected from the group of polymeric compositions of the present invention, with an olefinic terpolymer composition being preferred. The nominal wall thickness of the finished insulator 12 should be substantially the same as the nominal wall thickness of the insulator of intermediate shaped article, and should preferably be identically the same. Also, the ranges in the nominal wall thickness, as finished, should correspond to those given in connection with the corresponding shaped article. The mechanical and chemical characteristics of the finished insulator 12 correspond to those previously given in connection with the finished article including those listed in Tables 1-A and 1-B. In addition, the finished insulator 12 may have the following additional significant properties listed in Tables 2-A and 2-B:

TABLE 2-A

| Poly(ethylene-propylene-diene) Composition | | |
|---|---|---|
| II. | Electrical Characteristics | |
| | A. Specific Insulation Capacitance (at 60° F) (after 24 hours immersion) (IPCEA-A-19-81) | 3.5 (maximum) |
| | B. Insulation Resistance Constant, K (after 24 hours immersion at 60° F) (IPCEA-S-19-81) | 30,000 (minimum) |
| | C. Power Factor (at 75° C) (IPCEA-S-61-402) | .2% |

TABLE 2-B

| Chlorosulfonated Polyethylene Composition | | |
|---|---|---|
| II. | Electrical Characteristics | |
| | A. Specific Insulation Capacitance (at 60° F) (after 24 hours immersion) (IPCEA-S-19-81) | 7.5 (maximum) |
| | B. Insulation Resistance Constant, K (after 24 hours immersion at 60° F) (IPCEA-S-19-81) | 2000 (minimum) |
| | C. Power Factor (at 75° C) (IPCEA-S-61-402) | 6.5% |

While the aforesaid single layer construction has been described in terms of a single layer insulator or an electrical conductor article, it should be understood that additional layers of materials other than the polymeric compositions of the present invention may be applied to the single layer of polymeric composition of the present invention, such as fibrous filler material, electrically conductive shielding or an outer sheath. Also, the single layer construction, electrical conductor article 10 (FIG. 7) of the present invention may form a part of a multiple conductor, composite electrical conductor product, such as a multi-conductor cable.

In the composite construction of the insulator 12' of the finished electrical conductor article 10' of the present invention (FIG. 8), the composite electrical insulator 12' comprises a first layer 13 of a polymeric material selected from the group of polymeric compositions of the present invention and a second layer 14 of polymeric material selected from the group of polymeric compositions of the present invention. Preferably, the first layer 13 comprises one of said compositions and the second layer 14 comprises another of said compositions. In the preferred embodiment of the composite electrical conductor article 10', the first layer 13 comprises an olefinic terpolymer composition of the present invention and the second layer 14 comprises a halosulfonated polyolefin composition of the present invention. The respective nominal wall thicknesses of the two layers, single and in combination, should be substantially the same as those dimensions of the corresponding intermediate shaped article, and should preferably be identically the same. In addition, the ranges in the nominal wall thickness, as finished, should correspond to those given in connection with the corresponding intermediate shaped article. The mechanical and chemical characteristics of the finished composite insulator 12' corresponds to those previously given in connection with the finished shaped article including those listed in Table 1-A and 1-B. In addition, the finished insulator 12' may have the electrical characteristics listed in Tables 2-A and 2-B. Further, the preferred olefinic terpolymer composition/halosulfonated polyolefin composition construction provides improved heat aging and ozone and flame resistance characteristics while giving reduced smoke emission and hydrogen chloride off-gassing upon thermal degradation of the article. These characteristics are particularly valuable in power industry applications.

While the aforesaid composite insulator construction has been described in terms of a two layer construction, it should be understood that additional layers may be applied to this composite construction, electrically conductive shielding or an outer jacket. Also, the composite layer construction, electrical conductor article 10' (FIG. 8) of the present invention may form a part of a multiple conductor, composite electrical conductor product, such as a multi-conductor cable.

In a further embodiment of the present invention, a plurality of electrical conductor articles may be formed into a core bundle and a jacket comprised of a polymeric material selected from the group of polymeric compositions of the present invention may be thermoplastically extruded over the core bundle using the aforesaid thermoplastic extrusion technique. Thereafter, the jacket is cured as aforesaid. The core bundle may comprise one or more conductor articles of the present invention, in which case the conductor articles may be cured before the outer jacket is formed or contemporaneously with the jacket.

While the jacket may have the annular configuration of the finished shaped article, as aforesaid, and be formed by a drawn die, it may preferably be formed with a pressure die which forces the extruded composition into the interstices on the outer periphery of the bundle while providing a smooth, cylindrical outer surface to the jacket. Consequently, its configuration may be on its exterior and complementary to the core bundle it engages on its interior. The jacket may have a nominal wall thickness in both its uncured intermediate state and its cured final state from 20 mils to 100 mils, with from 45 mils to 80 mils being preferred. Preferably, it is composed of the aforesaid halosulfonated polyolefin composition, although the aforesaid olefinic terpolymer composition may be used.

While this further embodiment has been described, a core bundle with an outer, encompassing jacket, it should be understood that a plurality of the aforesaid jacketed bundles can be formed into a composite conductor product or that additional layers, such as electrically conductive shielding, and/or an outer jacket may be applied to the jacketed bundle.

The following specific examples serve to illustrate various features of the present invention. As such, they should be considered as illustrative and not limiting.

EXAMPLE 1

Using the aforesaid blending and subdividing techniques, a poly(ethylene-propylene-ethylidene norbornene) composition suitable for a tubular article was prepared using the following materials and proportions, expressed in parts by weight.

| | |
|---|---|
| 75 | EPsyn 4506 poly(ethylene-diene-ethylidene-norbornene) base polymer (from CoPolymer Rubber & Chemical Co.) |
| 25 | EPsyn 5509 poly(ethylene-diene-ethylene-norbornene) base polymer (from CoPolymer Rubber & Chemical Co.) |
| 125 | Burgess KE clay (Burgess Pigment Co.) |
| 5 | ST. JOE 20 zinc oxide (from St. Joe Minerals Corp.) |
| 1 | A-172 vinyl silane (from Union Carbide) |
| 20 | DYNH-3 polyethylene polymer (from Union Carbide) |
| .75 | AGERITE RESIN D poly(trimethyl dehydro quinoline) polymer (from R. T. Vanderbilt Company) |
| 3 | SR-230 (from Sartomer Resins) |
| 10 | SUNPAR 2280 paraffinic oil (from Sun Oil Co.) |

The uncured compositions had the characteristics listed in Table 3-A as follows:

TABLE 3-A

| | |
|---|---|
| 1. Heat Distortion (300° F) (IPCEA-S-61-402) (conditioned for 5 minutes; under load for 15 minutes) | 98% |
| 2. Tensile Modulus (Tensile strength at 50% elongation) (ASTM D-412) | 271 p.s.i. |
| 3. Ultimate Tensile strength (ASTM D-412) | 725 p.s.i. |
| 4. Ultimate Tensile elongation | 610% |
| 5. Hardness (Shore) | 56A |

The aforegoing composition was thermoplastically extruded using the aforesaid extrusion technique to provide a tubular article with an annular configuration of indeterminate length and having a nominal internal diameter of 0.375 inch and a nominal wall thickness of 62 mils. This intermediate shaped article was cured with high energy electrons having a kinetic energy of 1 Mev. at a dosage of 20 Mrads. The final dimensions of the article were the same as those of the intermediate shaped article.

The cured composition had the characteristics listed in Table 3-B as follows:

TABLE 3-B

| | |
|---|---|
| 1. Heat Distortion (300° F) (IPCEA-S-61-402) (conditioned for 5 minutes; under load for 15 minutes | 1.8% |
| 2. Tensile Modulus (Tensile Strength at 50% Elongation) (ASTM D-412) | 770 p.s.i. |
| 3. Ultimate Tensile Strength (ASTM D-412) | 1654 p.s.i. |
| 4. Ultimate Tensile Elongation (ASTM D-412) | 125% |
| 5. Hardness (Shore) | 61A |

EXAMPLE 2

Using the aforesaid blending and subdividing techniques, a chlorosulfonated polyethylene composition suitable for a tubular article was prepared using the following materials and proportions expressed in parts by weight:

| | |
|---|---|
| 100 | HYPALON 45 chlorosulfonated polyethylene base polymer (from duPont) |
| 35 | ONCOR 23A (from National Lead Co.) |
| 3 | FIREMASTER TD-23 (from Michigan Chemical Corp.) |
| 10 | FEF carbon black |
| 62 | MT carbon black |
| 6 | paraffin wax |
| 38 | CALCENE TM precipitated whiting (from PPG Industries, Inc.) |
| 11 | TLD-90 litharge (from Wyrough & Loser, Inc.) |

The uncured composition has the characteristics listed in Table 4-A as follows:

TABLE 4-A

| | |
|---|---|
| 1. Heat Distortion (300° F) (IPCEA-S-61-402) (conditioned for 5 minutes; under load for 15 minutes) | 92.1% |
| 2. Tensile Modulus (tensile strength at 50% elongation) (ASTM D-412) | 750 p.s.i. |
| 3. Ultimate Tensile Strength | 1250 p.s.i. |
| 4. Ultimate Tensile Elongation | 610% |
| 5. Hardness (Shore) | 78A |

The foregoing composition was thermoplastically extruded using the aforesaid extrusion technique to provide a tubular article with an annular configuration of indeterminate length and having a nominal internal diameter of 3/8 inch and a nominal wall thickness of 62 mils. This intermediate shaped article was cured with high energy electrons having a kinetic energy of 1 Mev. at a dosage of 15 Mrads. The final dimensions of the article were the same as those of the intermediate shaped article.

The cured composition had the characteristics listed in Table 4-B as follows:

TABLE 4-B

| | |
|---|---|
| 1. Heat Distortion (300° F) (IPCEA-S-61-402) (conditioned for 5 minutes; under load for 15 minutes) | 4.2% |
| 2. Tensile Modulus (tensile strength at 50% elongation) (ASTM D-412) | 1238 p.s.i. |
| 3. Ultimate Tensile Strength | 2300 p.s.i. |
| 4. Ultimate Tensile Elongation | 150% |
| 5. Hardness (Shore) | 82A |

EXAMPLE 3

Using the aforesaid blending and subdividing techniques, a poly(ethylene-propylene-ethylidene norbornene) composition and a chlorosulfonated polyethylene composition suitable for forming a composite electrical insulator was prepared using the following materials and proportions, expressed in parts by weight:

Poly(ethylene-propylene-ethylidene-norbornene)Composition

| | |
|---|---|
| 85 | EPsyn 4506 poly(ethylene-propylene-ethylidene norbornene) base polymer (from CoPolymer Rubber & Chemical Co.) |
| 15 | EPsyn 5509 poly(ethylene-propylene-ethylidene norbornene) base polymer (from CoPolymer Rubber & Chemical Co.) |
| 125 | BURGESS KE clay (from Burgess Pigment Co.) |
| 5 | zinc oxide (from St. Joe Minerals Co.) |
| 35 | DYNH-3 polyethylene (from Union Carbide) |
| 1 | A-172 vinyl silane (from Union Carbide) |
| 1 | AGERITE RESIN D poly(trimethyl dihydro quinoline) polymer (from R. T. Vanderbilt Company) |

Chlorosulfonated Polyethylene Composition

| | |
|---|---|
| 100 | HYPALON 45 chlorosulfonated polyethylene base polymer (from duPont) |
| 30 | TLD-90 litharge (from Wyrough & Loser) |
| 60 | HYDRAL 710 hydrated alumina (from Aluminum Co. of America) |
| 10 | Antimony (III) trioxide (from M & T Chemicals) |
| 5 | CHLOROWAX 70-S chlorinated paraffin (from Diamond Shamrock Co.) |
| 10 | CHLOROWAX LV chlorinated paraffin (from Diamond Shamrock Co.) |
| 3 | petrolatum |
| 2 | HELIOZONE (from duPont) |
| 2 | HVA-2 m-phenylene dimaleimide (from duPont) |
| 15 | FEF carbon black |

The foregoing poly(ethylene-propylene-ethylidene norbornene) composition was thermoplastically extruded over an electrical conductor of 18 A.W.G., 7-strand, tinned copper wire using the aforesaid extrusion technique to provide the first layer of a composite electrical insulator. The layer had an annular configuration of intermediate length and a nominal wall thickness of 30 mils.

The uncured poly(ethylene-propylene-ethylidene norbornene) composition had the characteristics listed in Table 5-A as follows:

TABLE 5-A

| | |
|---|---|
| 1. Heat Distortion (300° F) (IPCEA-S-61-402) (conditioned for 5 minutes; under load for 15 minutes) | 98% |
| 2. Tensile Modulus (tensile strength at 50% elongation) (ASTM D-412) | 495 p.s.i. |
| 3. Ultimate Tensile Strength | 980 p.s.i. |
| 4. Ultimate Tensile Elongation | 510% |
| 5. Hardness (Shore) | 65A |

The foregoing chlorosulfonated polyethylene composition was thermoplastically extruded over the aforesaid first layer using the aforesaid extrusion technique to provide the second layer of the composite electrical insulator. The second layer had an annular configuration of indeterminate length and a nominal wall thickness of 15 mils.

The uncured chlorosulfonated polyethylene composition had the characteristics listed in Table 5-B as follows:

TABLE 5-B

| | |
|---|---|
| 1. Heat Distortion (300° F) (IPCEA-S-61-402) (conditioned for 5 minutes; under load for 15 minutes) | 94.3% |
| 2. Tensile Modulus (tensile strength at 50% elongation) (ASTM D-412) | 290 p.s.i. |
| 3. Ultimate Tensile Strength | 921 p.s.i. |
| 4. Ultimate Tensile Elongation | 675% |
| 5. Hardness (Shore) | 72 A |
| 6. Tensile Modulus (tensile strength at 100% elongation) (ASTM D-412) | 388 p.s.i. |

The intermediate shaped article, i.e., the conductor with the uncured insulator was cured with high energy electrons having a kinetic energy of 1 Mev. at a dosage of 10 Mrads. The final dimensions of the article were the same as those of the intermediate shaped article.

The cured composite insulator has the characteristics listed in Table 5-C as follows:

TABLE 5-C

| | |
|---|---|
| 1. Heat Distortion (300° F) (IPCEA-S-61-402) (conditioned for 5 minutes; under load for 15 minutes) | 11.6% |
| 2. Tensile Modulus (tensile strength at 50% elongation) (ASTM D-412) | 682 p.s.i. |
| 3. Ultimate Tensile Strength | 1568 p.s.i. |
| 4. Ultimate Tensile Elongation | 192% |
| 5. Hardness (Shore) | 78 A |
| 6. Insulation Resistance Constant, K (at 15.6° C) (IPCEA-S-61-402) | greater than 40,000 |
| 7. Vertical Flame Test (IPCEA-S-61-402) | pass |

The terms "elastomer" and "elastomers," as used herein, refer to and describe macromolecular, or polymeric, materials which return rapidly to approximately their original dimensions and shape after substantial deformation by a weak stress and the subsequent release of the stress (see ASTM Standard D 1566-71).

The term "thermoplastic," as used herein, refers to and describes a material which is capable of being subjected to repeated cycles of alternate heating and cooling to respectively alternately soften and harden the material without significantly altering its rheology.

By the foregoing arrangement, the present invention provides an efficient and economical method of processing curable, thermoplastic elastomers into cured elastomeric shaped articles. Through the use of a modifiable master stock in a flowable solid form, it permits additional compounding and variations of properties during the extrusion operation. By providing an uncured intermediate shaped article which is substantially self-supporting and has shape and dimensional stability, the method provides convenient material handling of an uncured article. The method also provides a readily storable input stock and an intermediate article which has extended shelf life. In addition, the method can be carried out in either a continuous or a stepmanner, thereby providing processing flexibility.

The present invention also provides a finished shaped article having improved high strength; radiation, heat, oil and ozone resistance; and electrical characteristics. This finished article also incorporates excellent resistance to heat distortion and to abrasion while providing flame retardance with low smoke emission and hydrogen chloride off-gassing upon thermal degradation. These characteristics adapt the finished article for use as a tubing article or as an electrical insulation, such as in power industry instrumentation and thermocouple extension wire.

The terms and expressions which have been used are used as terms of description and illustration and not of limitation. There is no intention in the use of such terms and expressions of excluding any equivalents of any of the features shown or described, or portions thereof, and it is recognized that various modifications are posible within the scope of the invention claimed.

The embodiments of the invention in which an exclusive property or privilege is claimed are defined as follows:

1. A hollow tube comprising a heat resistant, radiation resistant, substantially dimensionally stable tube wall, said tube wall being the non-thermoplastic product of the electron curing with a dosage of at least about 1 megarad of a thermoplastic elastomer selected from the group consisting of a halosulfonated polyethylene, poly-ethylene-propylene ethylidene-norbornene) polymer, poly(ethylene-propylene-hexadiene) polymer, poly(ethylene-propylene-methylene norbornene) polymer and poly(ethylene-propylene-dicyclopentadiene) polymer.

2. The tube of claim 1 wherein the said polymer is poly(ethylene-propylene ethylidene-norbornene) polymer.

3. The tube of claim 1 wherein the said polymer is poly(ethylene-propylene-hexadiene) polymer.

4. The tube of claim 1 wherein the said polymer is poly(ethylene-propylene-methylene norbornene) polymer.

5. The tube of claim 1 wherein the said polymer is poly(ethylene-propylene-dicyclopentadiene) polymer.

6. The tube of claim 1 wherein the tube wall comprises a layer of poly(ethylene-propylene-diene) polymer and a layer of a halosulfonated polyethylene.

7. The tube of claim 6 wherein the said halosulfonated polyethylene is chlorosulfonated polyethylene.

8. The tube of claim 1 wherein the thermoplastic elastomer is a halosulfonated polyethylene.

9. The tube of claim 1 wherein said tube wall was cured with a dosage of from about 1 to about 20 megarads.

10. The tube of claim 1 wherein the said tube wall has a hardness of at least about Shore A 50.

11. The tube of claim 10 wherein the said tube wall has a tensile strength at 100% elongation of at least about 400 psi.

12. The tube of claim 11 wherein the said tube wall is reinforced and hardened with from about 50 to about 250 parts of a filler per 100 parts of a thermoplastic elastomer.

13. A hollow tube comprising a heat resistant, radiation resistant, substantially dimensionally stable tube wall, said tube wall being the non-thermoplastic product of the electron curing with a dosage of at least about 1 megarad of a poly(ethylene-propylene-diene) polymer.

* * * * *